United States Patent [19]
Sheldon

[11] Patent Number: 5,598,612
[45] Date of Patent: Feb. 4, 1997

[54] QUICK RELEASE BOLT

[76] Inventor: Douglas R. Sheldon, P.O. Box 141122, Anchorage, Ak. 99514

[21] Appl. No.: 526,492

[22] Filed: Sep. 11, 1995

[51] Int. Cl.⁶ .................................................. F16B 21/00
[52] U.S. Cl. ............................................. 24/635; 411/348
[58] Field of Search ................................. 411/348, 354, 411/267, 270; 24/635, 634

[56]  References Cited

U.S. PATENT DOCUMENTS

| | | | |
|---|---|---|---|
| 2,898,797 | 8/1959 | Bronstein | 411/348 |
| 3,033,016 | 5/1962 | Moberg | 411/348 |
| 3,444,773 | 5/1969 | Ligne | 411/348 |
| 3,623,194 | 11/1971 | Claeson | 24/635 |
| 4,908,916 | 3/1990 | Berte | 411/348 |
| 5,410,785 | 5/1995 | Huang | 24/635 |

FOREIGN PATENT DOCUMENTS 2915246  10/1976  Germany ................................. 24/634

Primary Examiner—Flemming Saether
Attorney, Agent, or Firm—Michael J. Tavella

[57]  ABSTRACT

A quick release bolt that replaces all the valve cover bolts presently in use in vehicles. To remove a vehicle's valve cover, the mechanic engages the quick release lever and the bolt simply lifts off. Stud bolts are installed in the engine head to hold the quick release bolts. Once the quick release bolts are removed, the valve cover can be removed by lifting it over the stud bolts. The valve adjustments can then be made and the valve cover and gasket can the be replaced. The bolts are then quickly snapped into place over the stud bolts and the valve cover is again secured to the engine. Although this device was developed for racing engines, it can be used in any application that utilizes bolts to secure one object to another.

5 Claims, 5 Drawing Sheets

5,598,612

QUICK RELEASE BOLT

This invention relates to quick release bolts and particularly to quick release bolts for use with automobile valve covers.

BACKGROUND OF THE INVENTION

In drag racing, the car engines need to be adjusted between races. One of the key maintenance tasks is to adjust the valves. To make these adjustments, the valve cover must be removed. The valve cover is typically secured by from four to eight bolts. Thus, to remove the valve cover, all the bolts must first be removed. When finished, the valve cover must be replaced along with the bolts. Removing the bolts becomes a time consuming step in the maintenance process. Typically, on a race day, these adjustments may have to be made four or five times. Saving time can improve pit crew performance by reducing stress on the crew.

Several types of quick release bolts have been developed. These bolts all have been developed for specific purposes and do not have the proper characteristics needed for this type of operation. Such bolt designs, however, are illustrative of the types of methods used to achieve the quick release operation. For example, U.S. Pat. No. 2,377,086 to Lang teaches a quick release apparatus for temporarily holding metal plates or sheets together. In this design, a shaft is provided that is inserted into a housing. A spring is loaded into the housing around the shaft. An operating handle is attached to the top of the shaft. Two pivoting teeth are rotatably mounted to the shaft. The device is used by pushing the housing through holes drilled in two plates that are then aligned. Under the operating handle is a holding plate that remains on the other side of the plates from the housing and the teeth. Once the housing is properly set, the operating handle is engaged, which causes the teeth to rotate out of the housing through two holes. The engagement of the teeth, which are curved as in a cam causes the plates to be pulled tightly together. Releasing the handle causes the teeth to withdraw, thereby allowing the plates to be separated.

U.S. Pat. No. 3,873,162 to Segawa illustrates a similar type quick release mechanism for bicycle wheels. Instead of the teeth of Lang, the Segawa design uses friction clips that engage bolt threads. The friction clips can be released when desired, releasing the bolt, which allows the wheel to be removed easily.

U.S. Pat. No. 4,974,888 to Childers illustrates another method of quick release mechanism. In this design, a nut is split and held in place by an expandable framework. The nut has teeth that correspond to the bolt. For quick release operation in the case of a secured bolt, the nut is caused to expand around the bolt, leaving the bolt unfettered by the threads. This allows the bolt to be quickly pulled from the nut. Similarly, to fasten the system, the bolt is pushed into the nut, causing the nut to expand. Once the bolt is in position, the nut closes around the bolt, creating a tight lock. This design is also intended to secure two parts together (i.e., a vending machine door and the frame). The design allows the bolt to be turned within the nut to further tighten the parts as desired.

A similar design in U.S. Pat. No. 4,930,961 to Weis teaches a design similar to the Childers design in that it uses a split bolt. Here, the bolt is a fixed stud mounted to a member. A workpiece is placed over the stud bolt and the nut can then be placed on the bolt above the workpiece. The nut is split to allow it to pass around the bolt threads quickly. Once the nut is flush against the workpiece, it engages the threads on the bolt. Then, the nut secures the workpiece and holds it securely. Additional tightening can be done once the nut has engaged the threads.

U.S. Pat. No. 5,123,794 to Pire is a quick release mechanism for use in space vehicles. Unlike the split nut designs above, this design uses a threaded stud that is secured into a body using a threaded well. The stud has a top extension that has a number of annular teeth. A grip arm is provided that can open and close about the annular teeth. The grip arm is operated hydraulically. To remove the assembly from the stud, the hydraulics operate the grip arm, which opened about the teeth, thereby allowing the assembly to be removed. The assembly can be reinstalled by causing the grip arm to open, sliding the assembly over the stud bolt and then closing the grip arm around the teeth. The stud bolt can then be removed by turning the bolt in the usual manner.

Finally, U.S. Pat. No. 5,205,693 to Fuller et al. teaches a quick release bolt for use with power lawn mower blades. In this design, two pins are used to secure the bolt in position on the mower. If the pins are removed, the bolt can be quickly removed. This device also includes a threaded adjustment mechanism so that the bolt seats with the proper tension to hole the mower blade securely.

SUMMARY OF THE INVENTION

The present invention is a quick release bolt that, in its primary purpose, replaces all the valve cover bolts presently in use. To remove the valve cover, the mechanic engages the quick release lever and the bolt simply lifts off. Stud bolts are installed in the engine head to secure the quick release bolt devices. Once the quick release bolts are removed, the valve cover can be removed by lifting it over the stud bolts. The valve adjustments can then be made and the valve cover and gasket can the be replaced. The bolts are then quickly snapped into place over the stud bolts and the valve cover is secured to the engine. Although this device was developed for racing engines, it can be used in any application that utilizes bolts to secure one object to another.

DETAILED DESCRIPTION OF THE INVENTION

Figure 1:
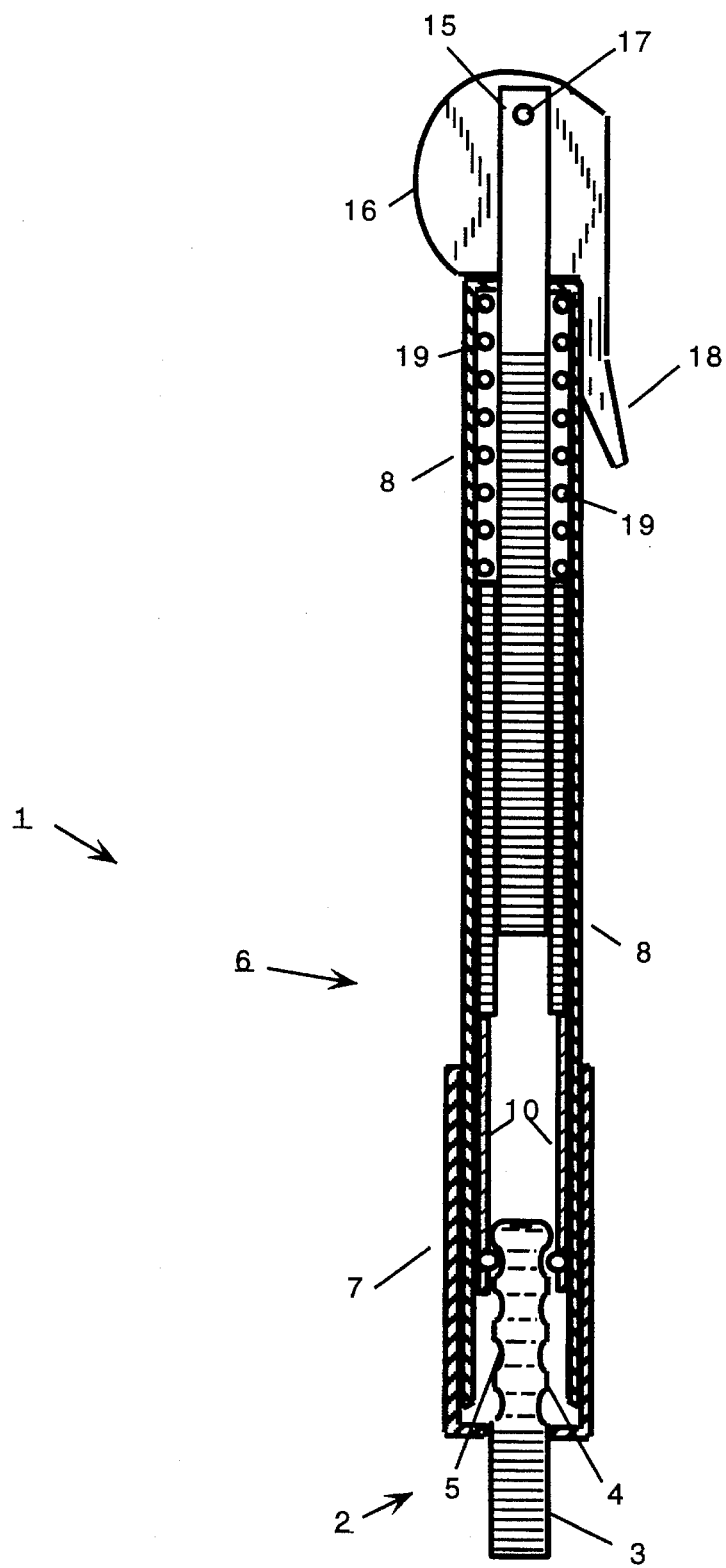
FIG. 1 is a cross-sectional view of the invention.
Figure 5:
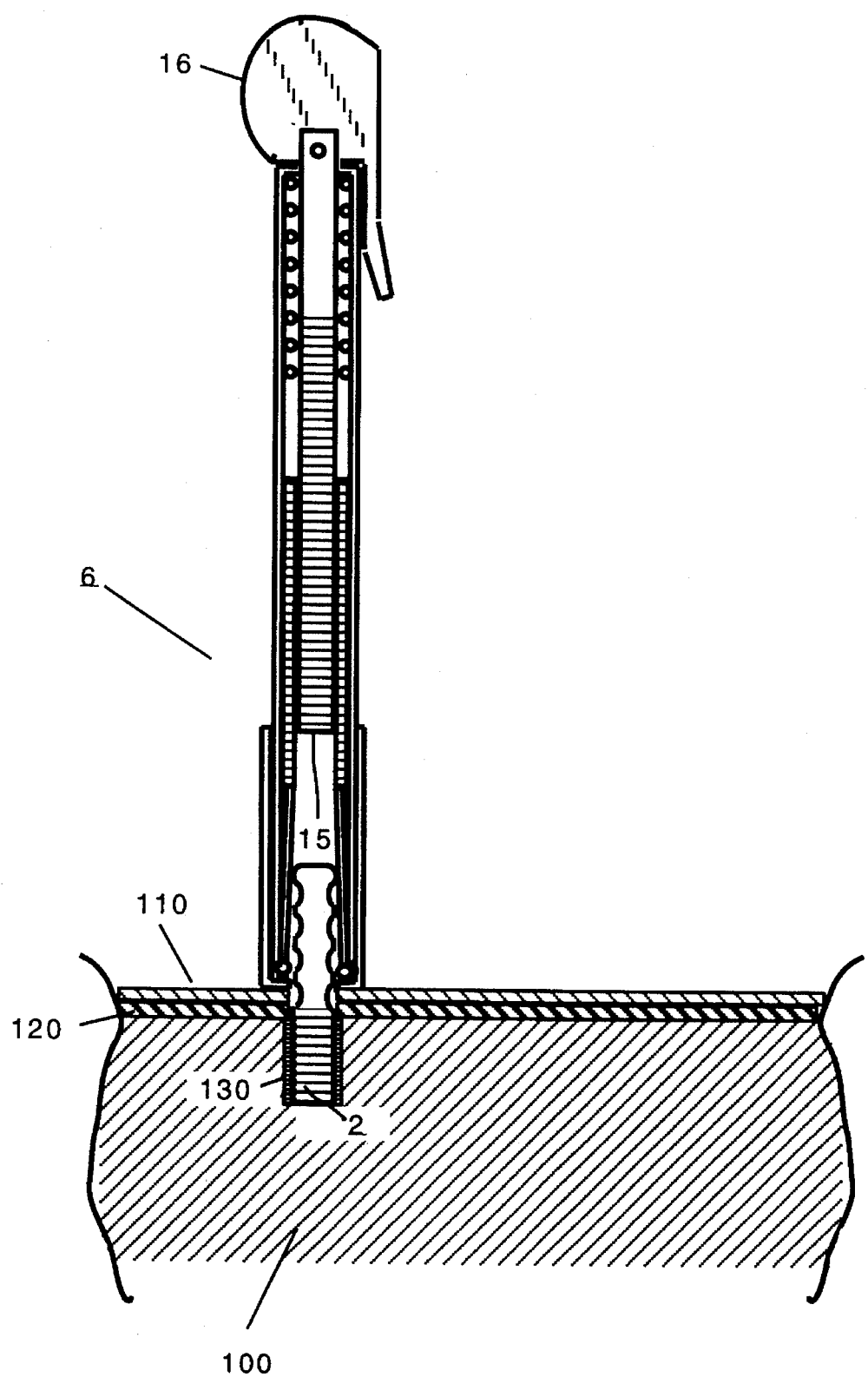
FIG. 5 is a detail view of the invention as installed on an engine to secure a valve cover.

Referring now to FIG. 1, the invention is shown in its assembled form without being installed in a mechanical body. FIG. 5 is a representative view of the invention as installed on an engine block 100, securing a valve cover 110.

Figure 2:
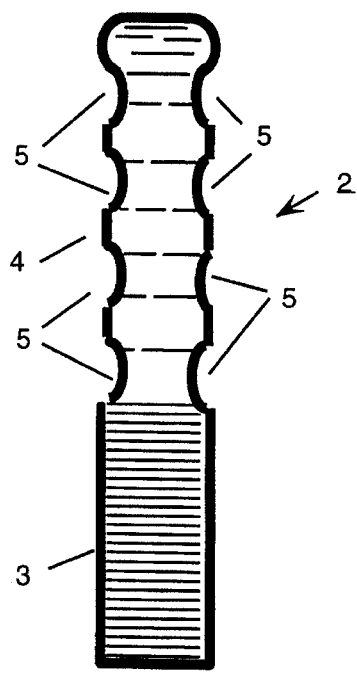
FIG. 2 is a cross sectional view of the stud bolt.
Figure 3:
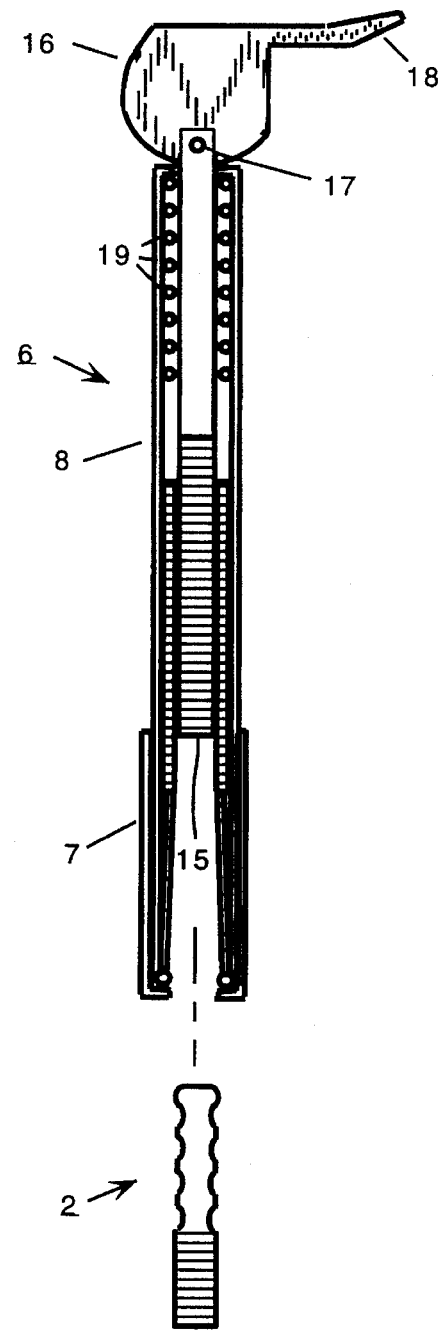
FIG. 3 is a cross section of the bolt removed from the stub bolt.

The quick release bolt 1 has two main parts. FIG. 3 shows these two parts separated. The first part is a stud bolt 2. The stud bolt 2 is typically secured in a mechanical body, such as an engine block 100 (see FIG. 5). Referring now to FIG. 2, the stud bolt 2 is cylindrical and has a threaded lower body 3 and a cylindrical upper body 4. The cylindrical upper body 4 has a number of annular grooves 5 as shown. The purpose of these grooves 5 is discussed below.

Figure 6:
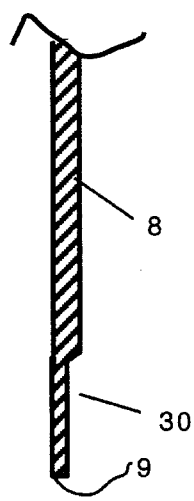
FIG. 6 is a detail view of the base of the upper housing, showing the tapered wall.
Figure 7:
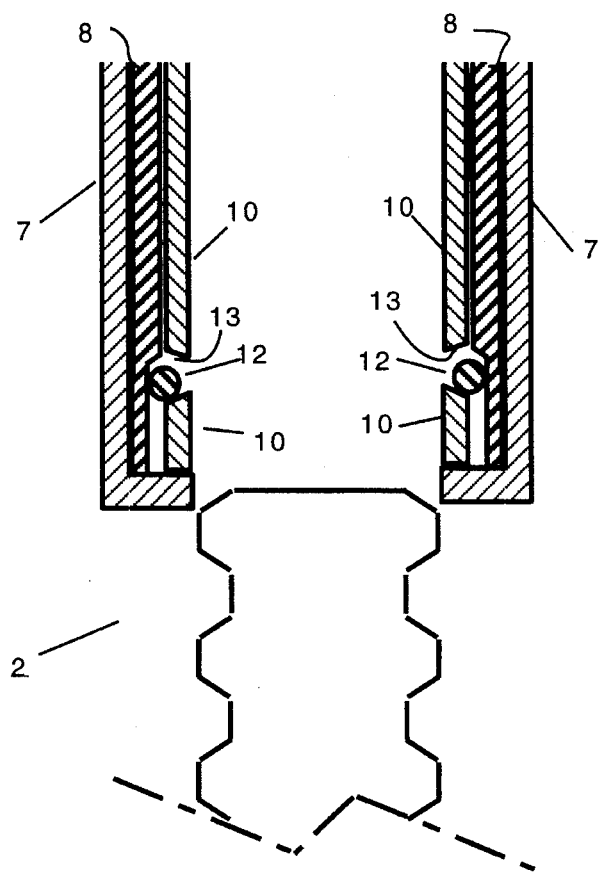
FIG. 7 is a cross-sectional detail view of the bolt tube when the cam lock is in the open position.
Figure 8:
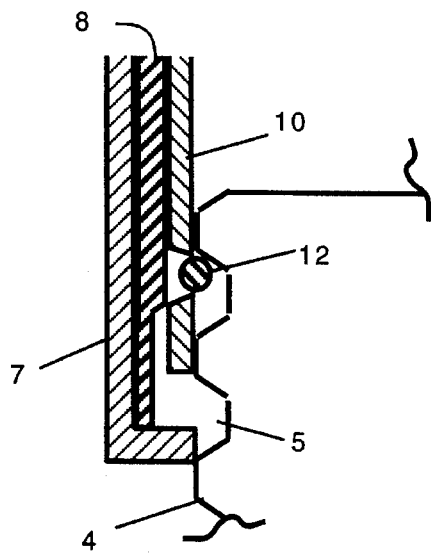
FIG. 8 is a cross-sectional detail view of the bolt tube when the cam lock is in the closed position and the bolt is secured in place.

The second main part is the bolt 6. The bolt 6 has a lower housing 7, and upper housing 8 that fits within the lower housing 7 and is secured to the lower housing 7. The upper housing 8 is generally cylindrical and has a uniform wall thickness, except at its base 9 (see FIGS. 6, 7 and 8). At the base 9 of the upper housing 8, the walls 30 are tapered to form a very thin cross section. The purpose of this thinning is discussed below. Within the upper housing 8 is a threaded tube 10. Ball bearings 12 float in tapered holes 13 as shown. In the drawings two ball bearings 12 are shown. However, one ball bearing 12 or several ball bearings 12 may be used. The placement and number of tapered holes 13 depends on the ultimate number of ball bearings 12 used. When the bolt 6 is fitted onto the stub bolt 2, the ball bearings 12 seat in the annular grooves 5 on the cylindrical upper body 4 of the stud bolt 2. See FIGS. 1, 5 and 8. When the ball bearings 12 are in the annular grooves 5, the bolt 6 cannot be removed.

Figure 4:
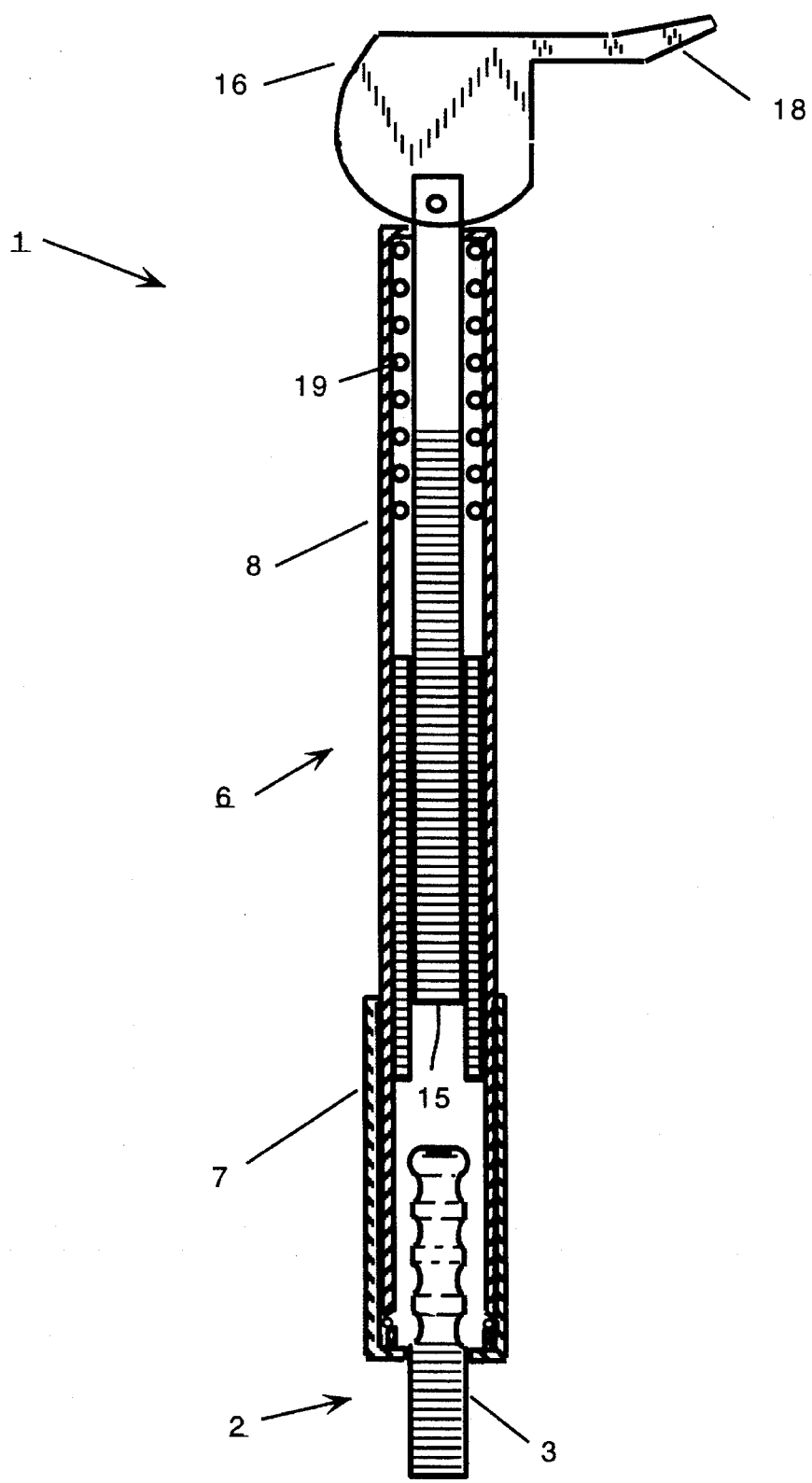
FIG. 4 is a cross section view of the bolt with the cam head in the release position.

A threaded rod 15 is inserted and screwed into the threaded tube 10 as shown. The threaded rod 15 connects to a cam 16 by a pin 17 as shown. The cam 16 is attached outside of the upper housing 8. The cam 16 has a handle 18 for turning the cam 16 to operate the quick release mechanism. A spring 19 is placed at the top of the upper housing 8 as shown to provided the needed downward force on the threaded tube 11 to allow the bolt 6 to be removed. The threaded rod 15 serves two purposes. First, the threaded rod 15 acts as a drive arm for the cam 16. Thus, when the cam 16 is turned, as shown in FIG. 4, the threaded rod 15 is pulled up or pushed down. This action causes the threaded tube 10 to move in concert with the threaded rod 15. As the threaded rod 15 is pushed down by rotating the cam 16, the threaded tube 10 is also pushed down. The ball bearings 12 fall outward against the tapered wall 30 when the base of the threaded tube 10 reaches the bottom of the upper housing 8. The ball bearings 12 then have enough clearance to pass the stud bolt 2 without impediment. In this way, the bolt 6 can be lifted off the stud bolt 2 without difficulty. To install the bolt 6, the process is reversed: The bolt 6 is placed over the stud bolt 2. The cam 16 is then turned, lifting the threaded rod 15 and, consequently, the ball bearings 12 pass the tapered wall 30. See FIG. 8. This forces the ball bearings 12 into the annular grooves 5 on the stud bolt 2, thereby locking the bolt 6 in place.

The second purpose of the threaded rod 15 is to allow adjustment of the bolt 6 to accommodate changes in the materials being held. For example, FIG. 5 shows the stud bolt 2 secured to the engine block 100. The stud bolt 2 is secured by screwing the threaded portion 3 of the stud bolt 2 into a threaded cylinder 130 in the engine block 100. A valve cover 110 is placed over the stud bolts 2 as shown. Typically, a gasket 120 is placed between the engine block 100 and the valve cover 110 as shown. As the engine block 100 is operated and the valve cover 110 is removed for service, the gasket 120 wears thin. As the thickness of the gasket 120 varies, the bolt 6, absent adjustment, do not hold as securely. To ensure a tight, connection under all circumstances, the threaded rod 15 is turned up or down as needed to adjust for different conditions. Thus, as the gasket 120 wears thin, the threaded rod 15 is turned down to compensate for the thinning gasket 120. When the gasket 120 is replaced with a thicker gasket 120, the bolt 6 might be too tight. To compensate, the threaded rod 15 is turned upward, thereby loosening the bolt 6 as needed to allow smooth operation of the cam 16.

Although this discussion has centered on the use of the invention with valve covers, the quick release bolt 1 can be used in any other situation where similar components are fastened together.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A quick-release bolt comprising:
   a) a stud bolt having a top portion and a bottom portion, said stud bolt having a plurality of threads formed on said bottom portion, and a plurality of annular grooves formed in said top portion;
   b) a removable bolt portion, removably attached to said stud bolt; said removable bolt portion including a lower housing, being cylindrical, and an upper housing, fixedly placed within said lower housing and extending upwardly therefrom, said upper housing having a top portion, a cylindrical wall having a thickness, and a bottom wall section, wherein the thickness of said bottom wall section is tapered;
   c) an inner guide rod, slidably installed within said upper housing and including means for lockably engaging the plurality of grooves in said stud bolt, said inner guide rod also having an upper portion extending upwards through said top portion of said upper housing; and
   d) a cam, pivotably connected to said upper portion of said inner guide rod, said cam also being in rotatable communication with said top portion of said upper housing such that as the cam is pivoted, it rotates against the top portion of said upper housing, and further such that as said cam rotates, said inner guide rod is raised or lowered within said upper housing.

2. The quick release bolt of claim 1 wherein the means for lockably engaging the plurality of grooves in said stud bolt comprise:
   a) A tapered hole, formed in said inner guide rod; and
   b) at least one ball bearing, slidably installed in said tapered hole in said inner guide rod.

3. The quick-release bolt of claim 1 further comprising: biasing means installed within said upper housing and in operable communication with said inner guide rod.

4. The quick-release bolt of claim 3 wherein the biasing means comprise a spring.

5. The method of installing a quick release bolt having a lower housing, an upper housing fixedly placed within said lower housing and extending upwardly therefrom, said upper housing having a top portion, a cylindrical wall having a thickness and a bottom wall section, wherein the thickness of said bottom wall section is tapered, an inner guide rod, slidably installed within said upper housing, at least one tapered hole, formed in said inner guide rod, and at least one ball bearing, slidably installed in said tapered hole in said inner guide rod said inner guide rod also having an upper portion extending upwards through said top portion of said upper housing; and a cam, pivotably connected to said upper portion of said inner guide rod, said cam also being in rotatable communication with said top portion of said upper housing such that as the cam is pivoted, it rotates against the top portion of said upper housing, such that as said cam rotates, said inner guide rod is raised or lowered within said upper housing, a stud bolt having a top portion and a bottom portion, said stud bolt having a plurality of threads formed on said bottom portion, and a plurality of annular grooves formed in said top portion comprising the steps of:

a) rotating the cam, which thereby pushes the inner guide rod downwards until said tapered hole is aligned with said bottom wall section on said lower housing;

b) having the ball bearing slide outward from said inner guide rod against said bottom wall section;

c) aligning said quick release bolt onto said stud bolt; and d) rotating the cam, thereby lifting said inner guide rod until said tapered hole in said inner guide rod is above said tapered section; thereby causing said ball bearing to slide into said tapered hole and to protrude therefrom into an annular groove on said stud bolt; thereby locking said quick release bolt in place.

* * * * *